US009753507B2

(12) United States Patent
Chen

(10) Patent No.: US 9,753,507 B2
(45) Date of Patent: Sep. 5, 2017

(54) REDISTRIBUTE WEIGHT OF COMPUTING DEVICE

(71) Applicant: HEWLETT-PACKARD DEVELOPMENT COMPANY, L.P., Houston, TX (US)

(72) Inventor: Chun-Chieh Chen, Taipei (TW)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 15/115,502

(22) PCT Filed: Mar. 20, 2014

(86) PCT No.: PCT/US2014/031335
§ 371 (c)(1),
(2) Date: Jul. 29, 2016

(87) PCT Pub. No.: WO2015/142342
PCT Pub. Date: Sep. 24, 2015

(65) Prior Publication Data
US 2017/0147046 A1 May 25, 2017

(51) Int. Cl.
G06F 1/16 (2006.01)
G06F 1/20 (2006.01)

(52) U.S. Cl.
CPC ............ G06F 1/203 (2013.01); G06F 1/166 (2013.01); G06F 1/1656 (2013.01); G06F 1/1669 (2013.01)

(58) Field of Classification Search
CPC ......... G06F 1/203; G06F 1/1656; G06F 1/166
See application file for complete search history.

(56) References Cited

U.S. PATENT DOCUMENTS

| 6,295,088 | B1 | 9/2001 | Tsukahara et al. |
| 7,421,813 | B2 | 9/2008 | Liou et al. |
| 7,751,190 | B2 | 7/2010 | Fujiwara |
| 2006/0039112 | A1 | 2/2006 | Minamitani et al. |
| 2009/0097206 | A1 | 4/2009 | Tomioka |
| 2010/0020480 | A1* | 1/2010 | Huang ............... H04M 1/0225 361/679.08 |
| 2010/0051243 | A1 | 3/2010 | All et al. |
| 2011/0090631 | A1 | 4/2011 | Atkinson |
| 2012/0033372 | A1* | 2/2012 | Liu .................... H04M 1/0202 361/679.27 |
| 2012/0057297 | A1 | 3/2012 | Merz et al. |
| 2013/0271913 | A1 | 10/2013 | Macdonald |
| 2014/0192468 | A1* | 7/2014 | Kotaka ............... H05K 5/0004 361/679.08 |

OTHER PUBLICATIONS

Moon, S.H. et al. ; "Experimental Study on the Thermal Performance of Micro-heat Pipe with Cross-section of Polygon"; Feb. 2004, On pp. 315-321; vol. 44; Issue: 2.

* cited by examiner

Primary Examiner — Adrian S Wilson
(74) Attorney, Agent, or Firm — HP Patent Department

(57) ABSTRACT

A computing device includes a display and a fluid channel. The fluid channel includes channel sections and fluid. The fluid may move between respective channel sections to redistribute a weight of the computing device.

15 Claims, 9 Drawing Sheets

REDISTRIBUTE WEIGHT OF COMPUTING DEVICE

BACKGROUND

Computing devices such as mobile computing devices include displays such as touch screens. Periodically, a user rotates the computing device to change the viewing orientation of and/or provide input to the display.

BRIEF DESCRIPTION OF THE DRAWINGS

Non-limiting examples are described in the following description, read with reference to the figures attached hereto and do not limit the scope of the claims. Dimensions of components and features illustrated in the figures are chosen primarily for convenience and clarity of presentation and are not necessarily to scale. Referring to the attached figures:

DETAILED DESCRIPTION

Computing devices such as mobile computing devices include displays such as touch screens. Users may rotate the computing device to change the viewing orientation of and/or provide input to the display. Such movement may result in disturbing force movements, screen shakes, and an uneven weight balance of the computing devices. Thus, an experience of a user in holding and/or using the tablet computing device may be decreased.

In examples, a tablet computing device includes a display, a display housing to support the display, electronic components, a fluid channel, and fluid. The display housing includes a plurality of sides and a housing cavity. The electronic components are disposed in the housing cavity. The electronic components enable operation of the tablet computing device. The fluid channel is disposed in the housing cavity. The fluid channel includes a plurality of channel sections. Each channel section corresponds to a respective side of the tablet computing device. The fluid is stored in the fluid channel to move between respective portions of the channel sections based on a rotation of the display housing to redistribute a weight of the tablet computing device. The redistribution of weight through movement of the fluid between respective portions of the channel sections in response to the rotation of the tablet computing device may reduce disturbing force movements, screen shakes, and uneven weight balance. Thus, the redistribution of weight through movement of the fluid may increase an experience of a user in holding and/or using the tablet computing device.

Figure 1:
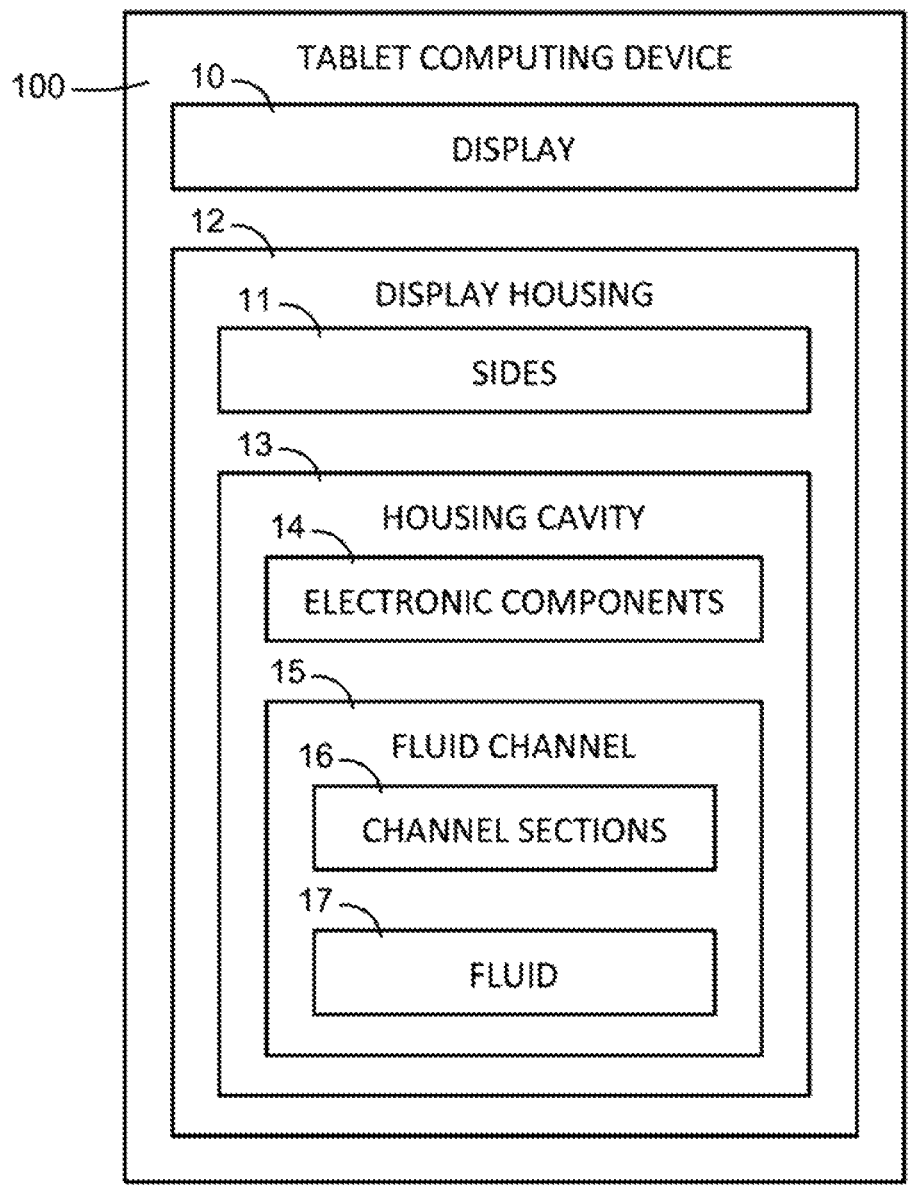
FIG. 1 is a block diagram illustrating a tablet computing device according to an example.

FIG. 1 is a block diagram illustrating a tablet computing device according to an example. Referring to FIG. 1, in some examples, a tablet computing device 100 includes a display 10, a display housing 12 to support the display, electronic components 14, a fluid channel 15, and fluid 17. In some examples, the display 10 may illustrate images, and the like. The display 10 may be an output device and an input device such as a touch screen. In some examples, the display housing 12 may be connected to an exterior surface of and/or formed on the display housing 12. The display housing 12 includes a plurality of sides 11 such as walls and a housing cavity 13. In some examples, the plurality of sides 11 may form a perimeter of the display housing 12. The electronic components 14 are disposed within the housing cavity 13. The electronic components 14 are configured to enable operation of the tablet computing device 100. That is, the electronic components 14 enable functionality of the tablet computing device 100.

Referring to FIG. 1, in some examples, the fluid channel 15 is disposed in the housing cavity 13. The fluid channel 15 includes a plurality of channel sections 16. Each channel section 16 corresponds to a respective side 11 of the tablet computing device 100. For example, for each one of the channel sections 16, a respective channel section 16 corresponds to a respective side 11 of the tablet computing device 100. In some examples, a respective channel section 16 may be adjacent to a corresponding side 11. Alternatively, a respective channel section 16 may not correspond to the respective sides 11. The fluid 17 stored in the fluid channel 15 moves between respective portions of channel sections 16 based on a rotation of the display housing 12 to redistribute a weight of the tablet computing device 100. That is, when fluid leaves a first region and arrives at a second region of the tablet computing device 100, the second region becomes heavier and the first region becomes lighter, for example, by the weight of the transported fluid.

Figure 2A:
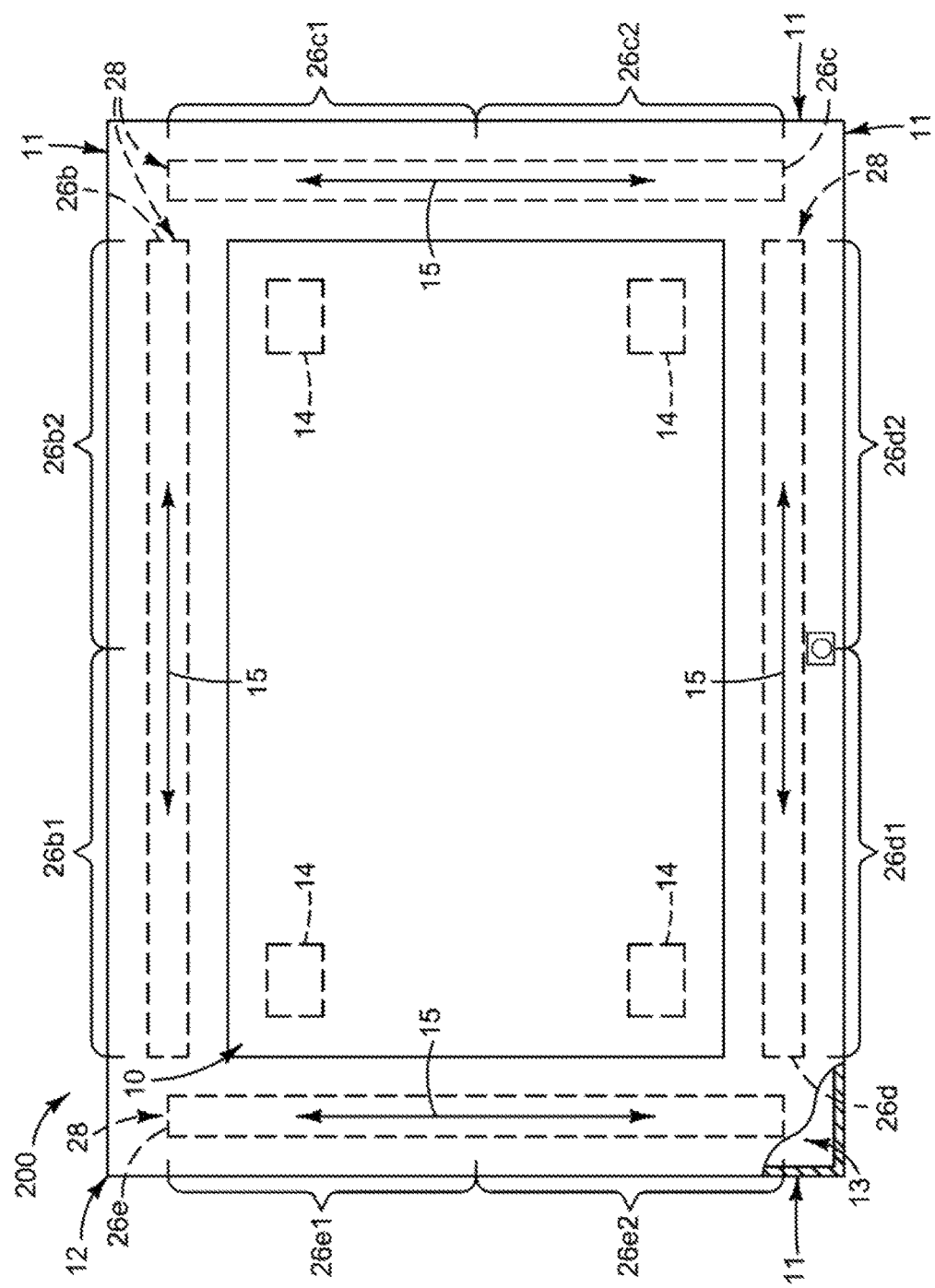
FIGS. 2A and 2B are schematic views illustrating a tablet computing device in various orientations according to examples.
Figure 2B:
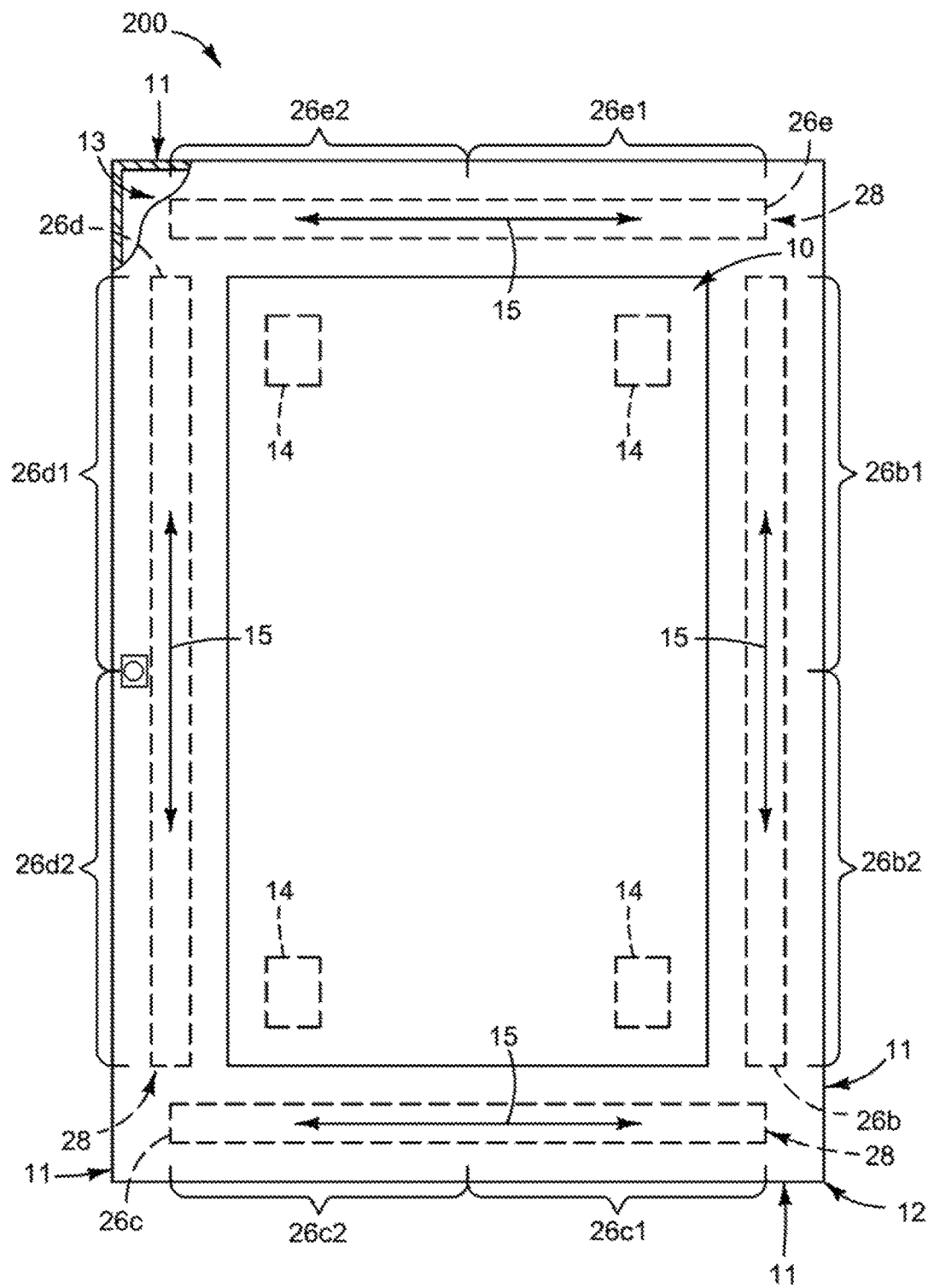
Figure 3:
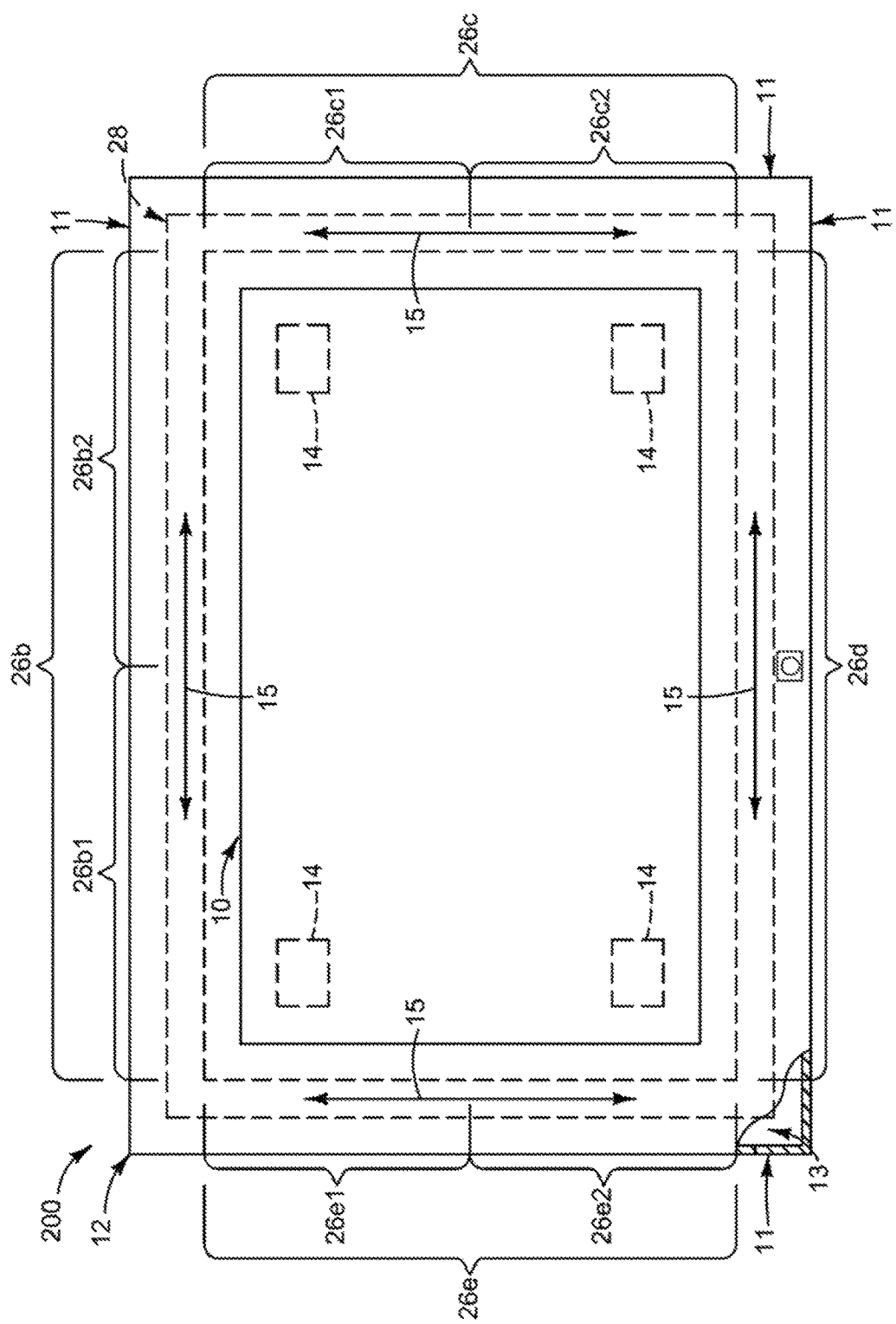
FIG. 3 is a schematic view illustrating the tablet computing device of FIG. 2A including a single pipe according to an example.
Figure 4:
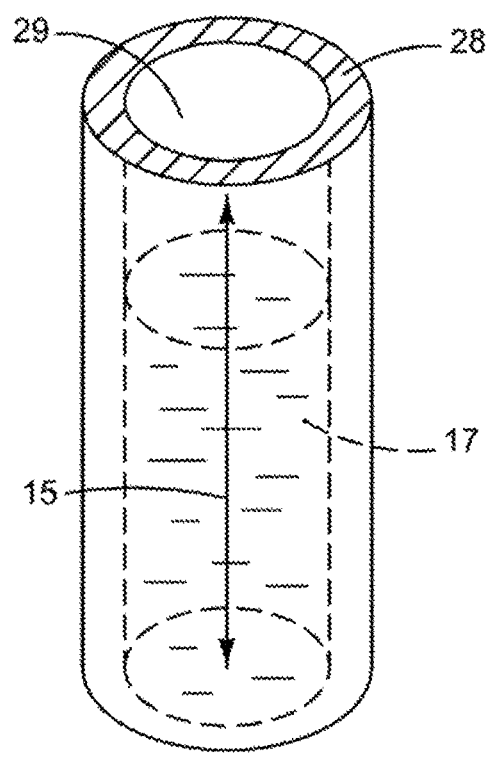
FIG. 4 is a schematic view illustrating a pipe of the tablet computing device of FIG. 2A according to an example.

FIGS. 2A and 2B are schematic views illustrating a tablet computing device in various orientations according to examples. FIG. 3 is a schematic view of the tablet computing device of FIG. 2A including a single pipe according to an example. FIG. 4 is a schematic view illustrating a pipe of the tablet computing device of FIG. 2A according to an example. The tablet computing device 200 may include the display 10, the display housing 12, the electronic components 14, the fluid channel 15, and the fluid 17 as previously discussed with respect to the tablet computing device 100 of FIG. 1.

Referring to FIGS. 2A-4, in some examples, the fluid 17 stored in the fluid channel 15 is configured to move between respective portions 26b1, 26b2, 26c1, 26c2, 26d1, 26d2, 26e1, and 26e2 of the channel sections 26b, 26c, 26d, and 26e (collectively 26) based on the rotation of the display housing 12 due to gravitational forces to redistribute the weight of the tablet computing device 200. That is, when the tablet computing device 200 is rotated by a user to change an orientation of the display 10, the fluid 17 impacted by gravity and guided by the fluid channel 15 may move between an upper portion upstream of a gravitational force and a lower portion downstream of the gravitational force for respective channel sections 26.

Referring to FIGS. 2A-4, in some examples, the fluid channel 15 is configured to store the fluid 17 to distribute heat from the electronic components 14. For example, heat generated from the electronic components 14 may raise the temperature of the display housing 12 and/or tablet computing device 200 that may be cooled by the fluid 17 absorbing heat and moving between respective portions 26b1, 26b2, 26c1, 26c2, 26d1, 26d2, 26e1, and 26e2 of the channel sections 26b, 26c, 26d, and 26e. The fluid 17 may be water, antifreeze, and the like. Thus, heat generated by the electronic components 14, and the like, may be dissipated.

Referring to FIGS. 2A-4, in some examples, the tablet computing device 200 may also include at least one pipe 28 such as a single pipe or a plurality of pipes. The at least one pipe 28 may be formed of metal, and the like. In some examples, the at least one pipe 28 may include a plurality of pipes. For example, each pipe 28 may form a respective channel section 26b, 26c, 26d, and 26e of the fluid channel 15 as illustrated in FIGS. 2A-3. Each pipe 28 may include a respective pipe cavity 29 having a respective cavity volume as illustrated in FIG. 4. The fluid 17 disposed in the respective pipe cavities 29 may be water. The water stored in each of the pipe cavities 29 may occupy a volume less than the respective cavity volume of the respective pipe cavity 29 in order for the fluid 17 to move between respective portions 26b1, 26b2, 26c1, 26c2, 26d1, 26d2, 26e1, and 26e2. The pipes 28 may be arranged with respect to each other to form a rectangular shape.

Alternatively, the at least one pipe 28 may include a single pipe as illustrated in FIG. 3. Referring to FIGS. 3 and 4, in some examples, the single pipe 28 may include a pipe cavity 29 therein having a single cavity volume to form the fluid channel 15 and store the fluid 17. The fluid 17 disposed in the pipe cavity 29 may be water. The water may occupy a volume less than the single cavity volume of the pipe cavity 29 to enable space for the water to be able to move between respective portions 26b1, 26b2, 26c1, 26c2, 26d1, 26d2, 26e1, and 26e2 of the channel sections 26b, 26c, 26d, and 26e. That is, the fluid 17 may move to a non-occupied space in a gravitational direction and guided by the pipe 28. The single pipe 28 may be arranged to form a closed loop having a rectangular shape. For example, a rectangular shape pipe arrangement may conform to a perimeter of the display housing 12 to enable the fluid 17 to flow in respective regions to more evenly distribute the weight thereof.

Figure 5:
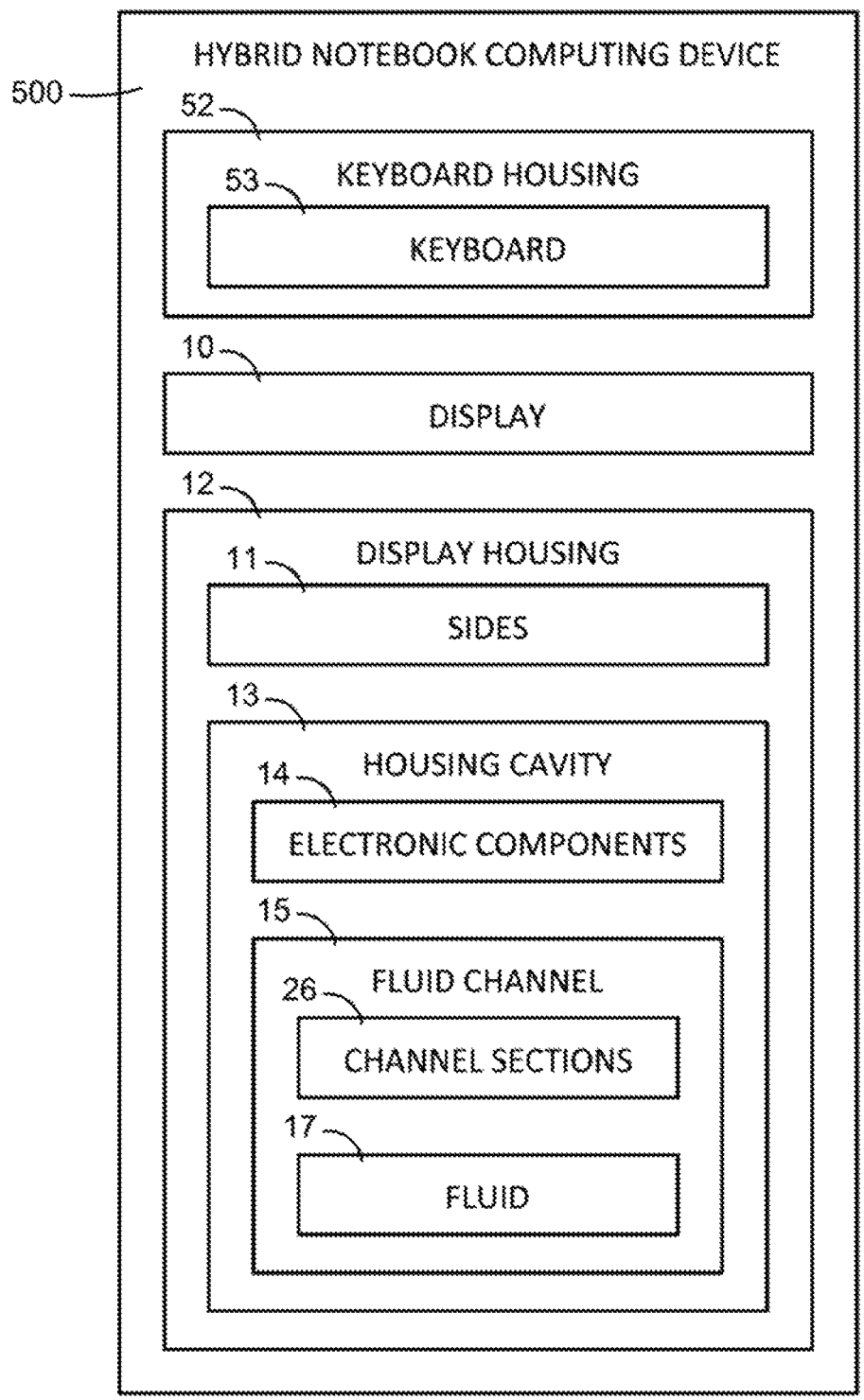
FIG. 5 is a block diagram illustrating a hybrid notebook computing device according to an example.
Figure 6A:
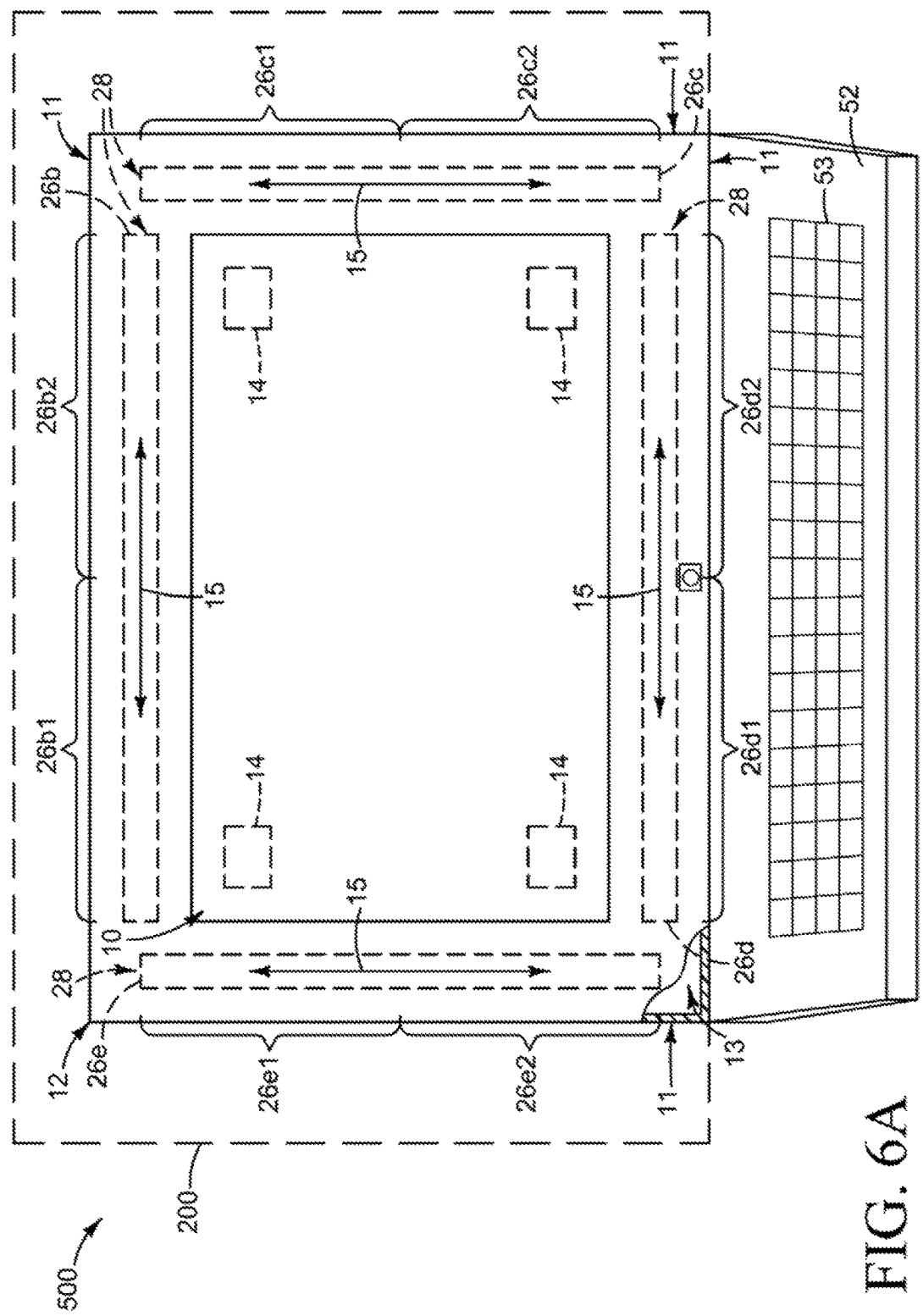
FIGS. 6A and 6B are schematic views illustrating the hybrid notebook computing device of FIG. 5 in an attached state and an unattached state, respectively, according to examples.
Figure 6B:
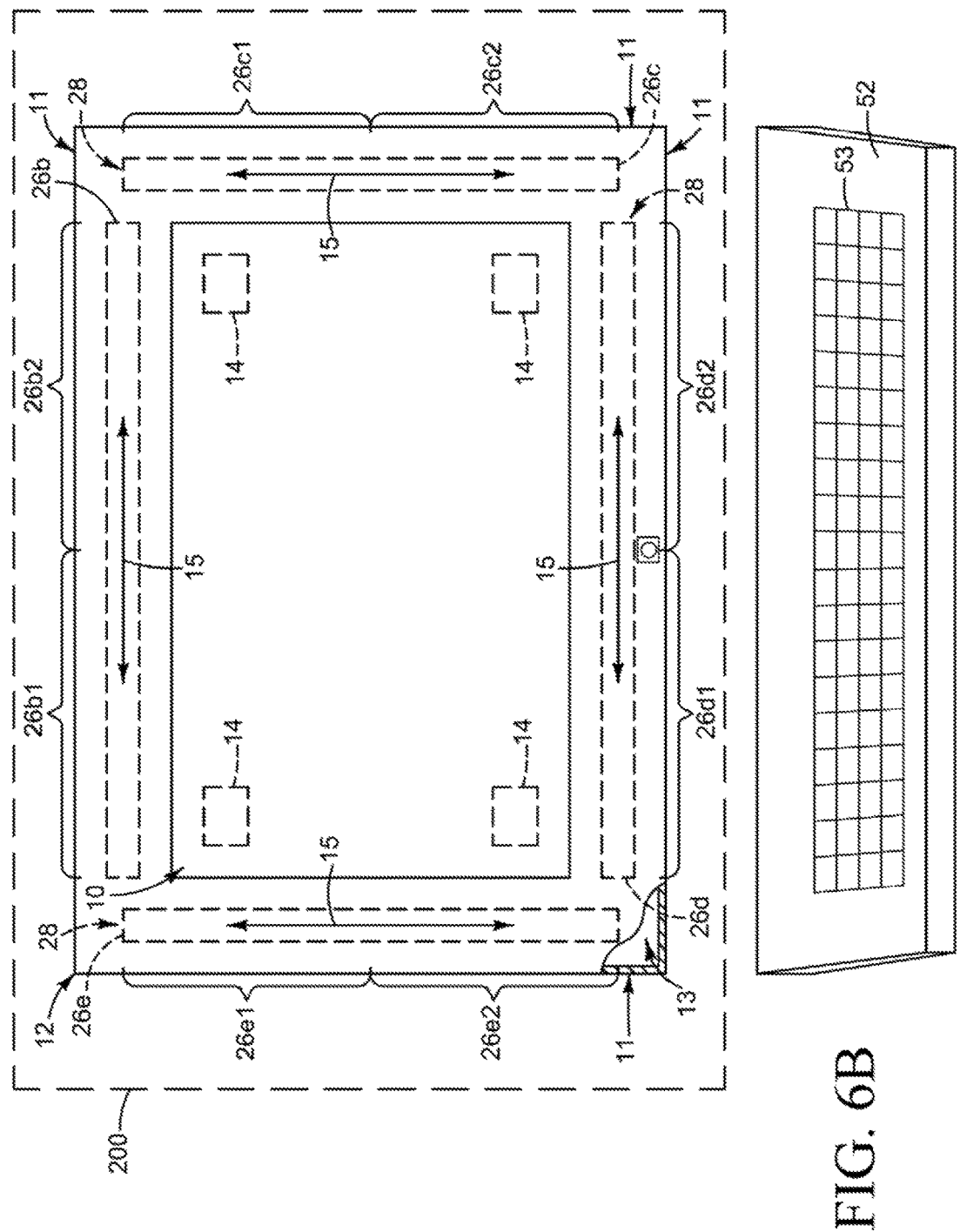

FIG. 5 is a block diagram illustrating a hybrid notebook computing device according to an example. FIGS. 6A and 6B are schematic views illustrating the hybrid notebook computing device of FIG. 5 in an attached state and an unattached state, respectively, according to examples. Referring to FIGS. 5-6B, in some examples, a hybrid notebook computing device 500 includes a keyboard housing 52, a display housing 12 removably attached to the keyboard housing 52, electronic components 14, a fluid channel 15, and fluid 17. An attached state is when the display housing 12 is attached to the keyboard housing 12, for example, for the hybrid notebook computing device 500 to function as a notebook computer as illustrated in FIG. 6A.

An unattached state is when the display housing 12 is unattached to the keyboard housing 52 as illustrated in FIG. 6B. In the unattached state, for example, the display 10 may function independently from the keyboard housing 52 as a tablet computing device. The keyboard housing 52 includes a keyboard 53. The display housing 12 includes a plurality of sides 11 and a housing cavity 13. The display 10 may be an output device and an input device such as a touch screen.

Referring to FIGS. 5-6B, in some examples, the electronic components 14 are disposed in the housing cavity 13. The electronic components 14 enable operation of the display 10. That is, the electronic components 14 enable functionality of the hybrid notebook computing device 500. The fluid channel 15 is disposed in the housing cavity 13. The fluid channel 15 includes a plurality of channel sections 26b, 26c, 26d, and 26e. Each channel section 26b, 26c, 26d, and 26e corresponds to a respective side 11 of the display housing 12. For example, for each one of the channel sections 26b, 26c, 26d, and 26e, a respective channel section 26b, 26c, 26d, and 26e corresponds to a respective side 11. For example, a respective channel section 26b, 26c, 26d, and 26e may be adjacent to a corresponding side 11.

Referring to FIGS. 5-6B, in some examples, the fluid 17 stored in the fluid channel 15 moves between respective portions 26b1, 26b2, 26c1, 26c2, 26d1, 26d2, 26e1, and 26e2 of the channel sections 26b, 26c, 26d, and 26e based on a rotation of the display housing 12. For example, when the display housing 12 is rotated by a user to change an orientation of the display 10 in an unattached state, the fluid 17 impacted by gravity and guided by the fluid channel 15 may move. That is, the fluid 17 may move between an upper portion upstream of a gravitational force and a lower portion downstream of the gravitational force for each of the channel sections 26b, 26c, 26d, and 26e.

Referring to FIGS. 5-6B, in some examples, the hybrid notebook computing device 500 may also include at least one pipe 28 including a pipe cavity 29 therein having a cavity volume to form the fluid channel 15 and store the fluid 17 to distribute heat from the electronic components 14. For example, heat generated from the electronic components 14 may raise the temperature of the display housing 12 and/or hybrid notebook computing device 500 that may be cooled by the fluid moving between respective portions 26b1, 26b2, 26c1, 26c2, 26d1, 26d2, 26e1, and 26e2 of the channel sections 26b, 268, 26d, and 26e. The fluid 17 stored in the fluid channel 15, such as water, may move between the respective portions 26b1, 26b2, 26c1, 26c2, 26d1, 26d2, 26e1, and 26e2 of the channel sections 26b, 26c, 26d, and 26e based on the rotation of the display housing 12 and gravitational forces. That is, the fluid 17 may move to a non-occupied space in a gravitational direction and guided by the respective pipe 28.

Figure 7:
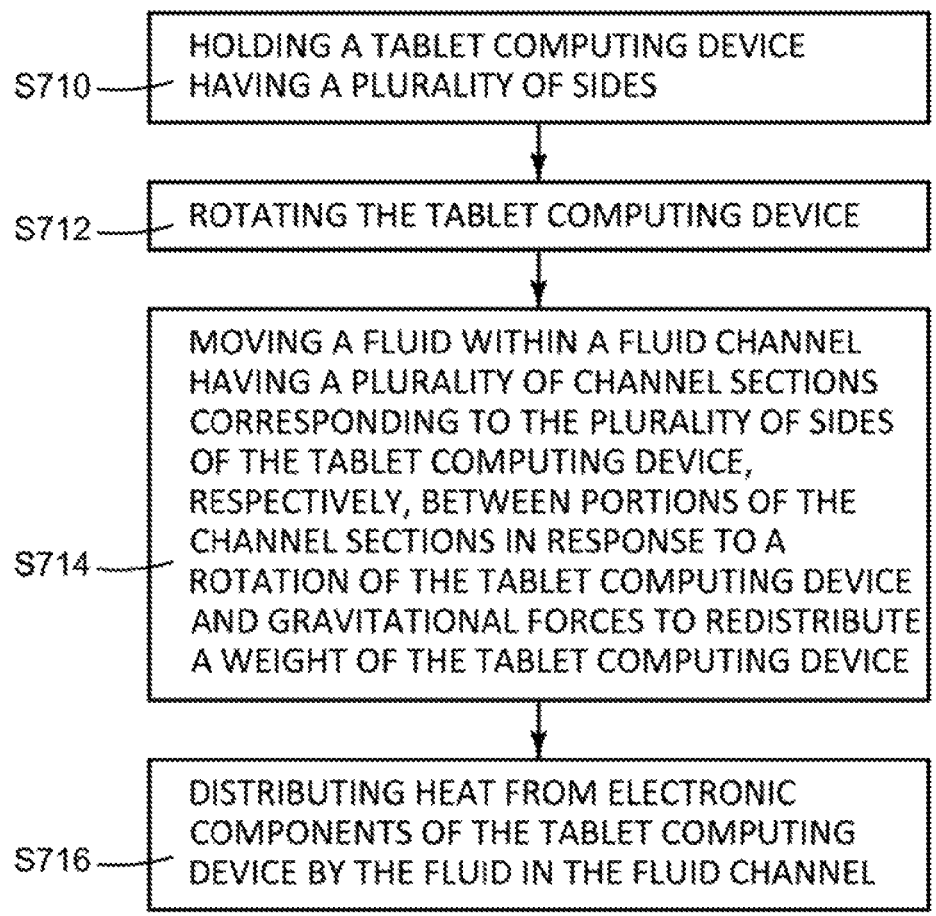
FIG. 7 is a flowchart illustrating a method of operating a tablet computing device according to an example.

FIG. 7 is a flowchart illustrating a method of operating a tablet computing device according to an example. In some examples, the modules and/or assemblies implementing the method may be those described in relation to the tablet computing devices 100 and 200 of FIGS. 1-4. In block S710, a tablet computing device having a plurality of sides is held by a user. For example, the tablet computing device 100 may be held by a user. In block S712, the tablet computing device is rotated. For example, a user may rotate the tablet computing device to change the viewing orientation of and/or provide input to the display. In block S714, a fluid within a fluid channel having a plurality of channel sections corresponding to the plurality of sides of the tablet computing device, respectively, is moved between respective portions of the channel sections in response to a rotation of the tablet computing device and gravitational forces. For example, for each one of the channel sections, a respective channel section corresponds to a respective side of the tablet computing device. For example, a respective channel section may be adjacent to a corresponding side.

In block S716, heat from electronic components of the tablet computing device is distributed by the fluid in the fluid channel. For example, heat generated from the electronic components may raise the temperature of the display housing and/or tablet computing device that may be cooled by the fluid absorbing heat and moving between respective portions of the channel sections. The fluid may be water, antifreeze, and the like. Thus, heat generated by the electronic components, and the like, may be dissipated.

It is to be understood that the flowchart of FIG. 7 illustrates architecture, functionality, and/or operation of examples of the present disclosure. If embodied in software, each block may represent a module, segment, or portion of code that includes one or more executable instructions to implement the specified logical function(s). If embodied in hardware, each block may represent a circuit or a number of interconnected circuits to implement the specified logical function(s). Although the flowchart of FIG. 7 illustrates a specific order of execution, the order of execution may differ from that which is depicted. For example, the order of execution of two or more blocks may be rearranged relative to the order illustrated. Also, two or more blocks illustrated in succession in FIG. 7 may be executed concurrently or with partial concurrence. All such variations are within the scope of the present disclosure.

The present disclosure has been described using non-limiting detailed descriptions of examples thereof that are not intended to limit the scope of the general inventive concept. It should be understood that features and/or operations described with respect to one example may be used with other examples and that not all examples have all of the features and/or operations illustrated in a particular figure or described with respect to one of the examples. Variations of examples described will occur to persons of the art. Furthermore, the terms "comprise," "include," "have" and their conjugates, shall mean, when used in the disclosure and/or claims, "including but not necessarily limited to."

It is noted that some of the above described examples may include structure, acts or details of structures and acts that may not be essential to the general inventive concept and which are described for illustrative purposes. Structure and acts described herein are replaceable by equivalents, which perform the same function, even if the structure or acts are different, as known in the art. Therefore, the scope of the general inventive concept is limited only by the elements and limitations as used in the claims.

What is claimed is:

1. A tablet computing device, comprising:
   a display; and
   a display housing to support the display, the display housing having a plurality of sides and a housing cavity;
   electronic components disposed in the housing cavity, the electronic components configured to enable operation of the tablet computing device;
   a fluid channel disposed in the housing cavity, the fluid channel including a plurality of channel sections in which each channel section corresponds to a respective side of the tablet computing device; and
   a fluid stored in the fluid channel to move between respective portions of the channel sections based on a rotation of the display housing to redistribute a weight of the tablet computing device.

2. The tablet computing device of claim 1, wherein the fluid stored in the fluid channel is configured to move between the respective portions of the channel sections based on the rotation of the display housing due to gravitational forces.

3. The tablet computing device of claim 1, wherein the fluid channel is configured to store the fluid to distribute heat from the electronic components.

4. The tablet computing device of claim 1, wherein the fluid is water.

5. The tablet computing device of claim 1, further comprising:
   a single pipe including a pipe cavity therein having a single cavity volume to form the fluid channel and store the fluid.

6. The tablet computing device of claim 1, further comprising:
   a plurality of pipes, each pipe including a respective pipe cavity having a respective cavity volume.

7. The tablet computing device of claim 5, wherein the single pipe is arranged to form a closed loop having a rectangular shape.

8. The tablet computing device of claim 6, wherein the pipes are arranged with respect to each other to form a rectangular shape.

9. The tablet computing device of claim 5, wherein the fluid is water occupying a volume less than the single cavity volume of the pipe cavity.

10. The tablet computing device of claim 6, wherein the fluid is water stored in each of the respective pipe cavities, the water in each respective pipe cavity occupies a volume less than the respective cavity volume of the respective pipe cavity.

11. A hybrid notebook computing device, comprising:
    a keyboard housing including a keyboard;
    a display housing removably attached to the keyboard housing, the display housing including a plurality of sides and a housing cavity;
    a display disposed on the display housing;
    electronic components disposed in the housing cavity, the electronic components to enable operation of the display;
    a fluid channel disposed in the housing cavity, the fluid channel including a plurality of channel sections in which each channel section corresponds to a respective side of the display housing; and
    a fluid stored in the fluid channel to move between respective portions of the channel sections based on a rotation of the display housing to redistribute a weight thereof.

12. The hybrid notebook computing device of claim 11, wherein the fluid stored in the fluid channel is configured to move between the respective portions of the channel sections based on the rotation of the display housing and gravitational forces.

13. The hybrid notebook computing device of claim 11, further comprising:
    at least one pipe including a pipe cavity therein having a cavity volume to form the fluid channel and store the fluid to distribute heat from the electronic components.

14. The hybrid notebook computing device of claim 11, wherein the fluid is water.

15. A method of operating a tablet computing device, the method comprising:
    holding a tablet computing device having a plurality of sides;
    rotating the tablet computing device;
    moving a fluid within a fluid channel having a plurality of channel sections corresponding to the plurality of sides of the tablet computing device, respectively, between portions of the channel sections in response to a rotation of the tablet computing device and gravitational forces to redistribute a weight of the tablet computing device; and distributing heat from electronic components of the tablet computing device by the fluid in the fluid channel.

* * * * *